(12) United States Patent
Rosario Gonzales

(10) Patent No.: US 11,370,361 B1
(45) Date of Patent: Jun. 28, 2022

(54) HITCH/STEP SYSTEM

(71) Applicant: Israel Rosario Gonzales, Davie, FL (US)

(72) Inventor: Israel Rosario Gonzales, Davie, FL (US)

( * ) Notice: Subject to any disclaimer, the term of this patent is extended or adjusted under 35 U.S.C. 154(b) by 0 days.

(21) Appl. No.: 17/393,194

(22) Filed: Aug. 3, 2021

Related U.S. Application Data

(60) Provisional application No. 63/103,371, filed on Aug. 3, 2020.

(51) Int. Cl.
  *B60R 3/00* (2006.01)
  *B60D 1/06* (2006.01)
  *B60D 1/42* (2006.01)

(52) U.S. Cl.
  CPC ............... *B60R 3/007* (2013.01); *B60D 1/06* (2013.01); *B60D 1/42* (2013.01)

(58) Field of Classification Search
  CPC .............. B60R 3/007; B60D 1/06; B60D 1/42
  See application file for complete search history.

(56) References Cited

U.S. PATENT DOCUMENTS

| | | | | |
|---|---|---|---|---|
| 4,860,476 A * | 8/1989 | Hall | ........................ | G09F 21/04 40/593 |
| 4,989,892 A * | 2/1991 | Kerins | ..................... | B60D 1/04 280/504 |
| 6,491,315 B2 * | 12/2002 | Hagen | .................. | B60Q 1/2661 224/527 |
| 6,530,588 B1 * | 3/2003 | Varney | .................... | B60R 3/007 280/163 |
| 7,390,003 B1 * | 6/2008 | Sylvia | ..................... | B60R 3/007 280/163 |
| 8,727,364 B2 * | 5/2014 | Masanek, Jr. | ............ | B60D 1/58 280/163 |
| 9,805,632 B2 * | 10/2017 | Frost | ..................... | G09F 21/048 |
| 2003/0011164 A1 * | 1/2003 | Cipolla | ................... | B60R 3/007 280/164.1 |
| 2010/0127479 A1 * | 5/2010 | Weipert | .................... | B60D 1/07 280/491.1 |
| 2018/0265007 A1 * | 9/2018 | Good | ....................... | B60D 1/06 |

* cited by examiner

*Primary Examiner* — Tony H Winner
(74) *Attorney, Agent, or Firm* — Sandra L. Layer

(57) ABSTRACT

A hitch/step system which includes a main body that acts as a step when installed in a horizontal position and a vertically adjustable hitch when installed in a vertical position. In addition to a hitch attachments are provided for use with the hitch including a ball mount, a pindle lock and a shackle. The hitch attachments are interchangeable and seperably coupled to the main body and may be removed when not towing and when using as a step. Additional components include interior reflectors and removable LED lights.

9 Claims, 16 Drawing Sheets

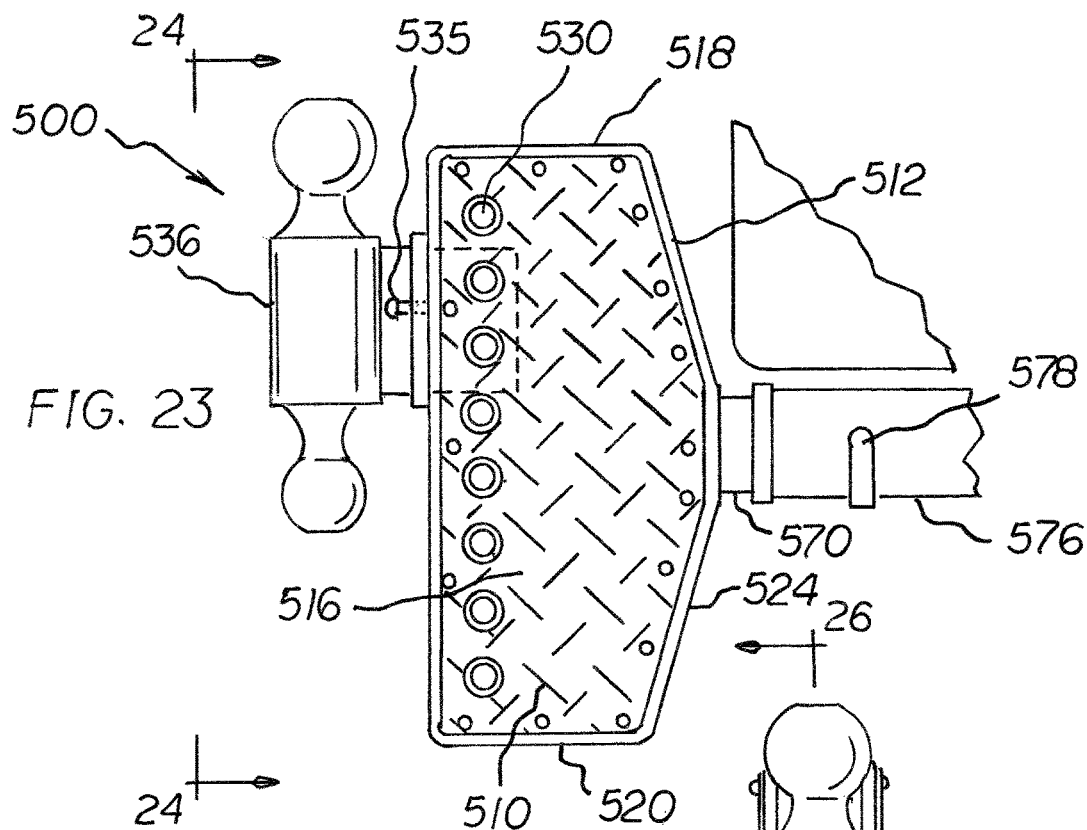
FIG. 23
FIG. 24
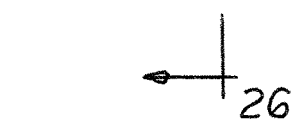
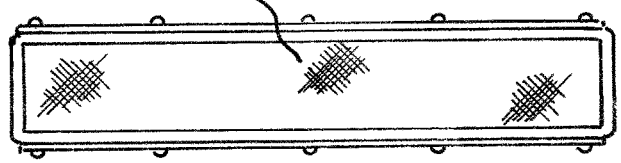
FIG. 25

FIG. 29
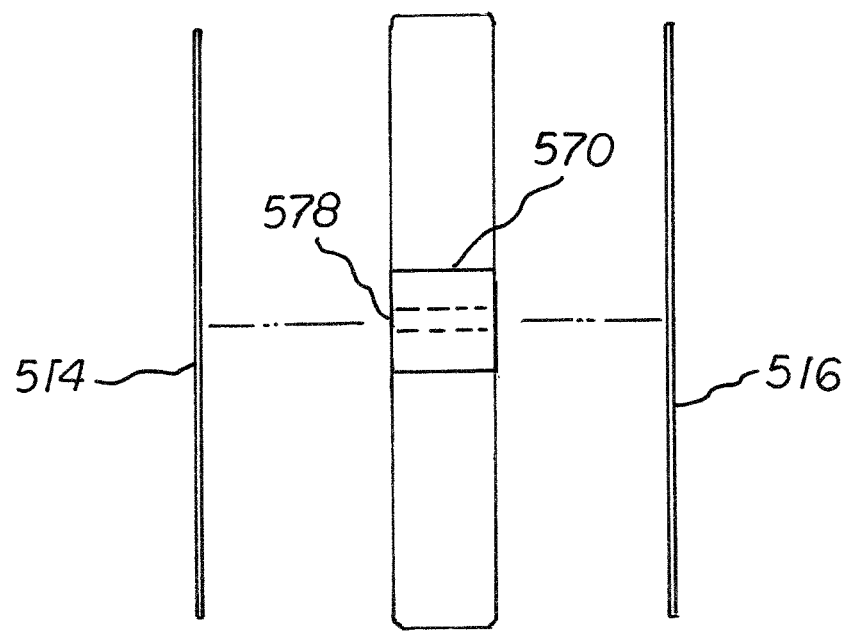
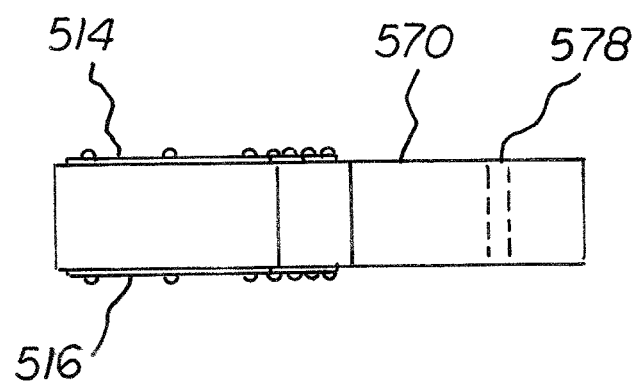
FIG. 30

HITCH/STEP SYSTEM

RELATED APPLICATION

The present patent application claims priority to the corresponding provisional patent application Ser. No. 63/103,371, filed on Aug. 3, 2020, the subject matter of which is incorporated herein by reference.

BACKGROUND OF THE INVENTION

Field of the Invention

The present invention relates to a hitch/step system and more particularly pertains to a vertically adjustable hitch for coupling a trailer to a vehicle and providing a supporting platform for use as a step. The coupling and the supporting being done in a safe convenient, and economical manner.

DESCRIPTION OF THE PRIOR ART

The use of adjustable hitches and steps of known design and configurations is known in the prior art. More specifically, hitch/step of known designs and configurations previously devised and utilized for the purpose of coupling a vehicle to a trailer at various heights and providing a platform for use as a step are known to consist basically of familiar, expected, and obvious structural configurations, notwithstanding the myriad of designs encompassed by the crowded prior art which has been developed for the fulfillment of countless objectives and requirements.

While these known devices fulfill their respective, particular objectives and requirements, they do not describe a hitch/step system that allows for coupling a vehicle to a trailer at various heights and providing a supporting platform for use as a step. The coupling and the supporting being done in a safe, convenient, and economical manner.

In this respect, the hitch/step system according to the present invention substantially departs from the conventional concepts and designs of the prior art, and in doing so provides an apparatus primarily developed for the purpose of coupling a vehicle to a trailer at various heights and providing a supporting platform for use as a step. The coupling and the supporting being done in a safe, convenient, and economical manner.

Therefore, it can be appreciated that there exists a continuing need for a new and improved hitch/step system which can be used for coupling a vehicle to a trailer at various heights and providing a supporting platform for use as a step. In this regard, the present invention substantially fulfills these needs.

SUMMARY OF THE INVENTION

In view of the foregoing disadvantages inherent in the known types of hitch/steps of known designs and configurations now present in the prior art, the present invention provides an improved hitch/step system. As such, the general purpose of the present invention, which will be described subsequently in greater detail, is to provide a new and improved hitch/step system and method which has all the advantages of the prior art and none of the disadvantages.

To attain this, for a broad perspective, the present invention essentially comprises a receiver housing formed with a coupling leg for attaching to a standard hitch receiver. A ball mount, and retaining pins for coupling the ball mount and other attachments to the receiver housing. The receiver housing configured for use as a step when in a horizontal orientation and for use as a vertically adjustable hitch when in a vertical orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hitch/step system which has all of the advantages of the prior art hitch/step systems of known designs and configurations and none of the disadvantages.

It is another object of the present invention to provide a new and improved hitch/step system which may be easily and efficiently manufactured and marketed.

It is a further object of the present invention to provide a new and improved hitch/step system which is of durable and reliable constructions.

An even further object of the present invention is to provide a new and improved hitch/step system which is susceptible of a low cost of manufacture with regard to both materials and labor, and which accordingly is then susceptible of low prices of sale to the consuming public, thereby making such hitch/step system economically available to the buying public.

Lastly, it is an object of the present invention to provide a hitch/step system for separably coupling a trailer to a vehicle at various heights when in a vertical orientation and providing a platform for use as a step when in a horizontal orientation.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 23 is a side elevational view of a hitch/step system having an open interior constructed in accordance with another alternate embodiment of the current invention.

FIG. 24 is a front elevational view of an alternate embodiment of a hitch/step system taken along lines 24-24 of FIG. 23.

FIG. 25 is a front elevational view of an alternate embodiment of a hitch/step system having interior reflectors.

FIG. 29 is an exploded rear view of another alternate embodiment of a hitch/step system showing the upper and lower plates separate from the housing taken along line 29-29 of FIG. 28.

FIG. 30 is a side elevational view of another alternate embodiment of a hitch step system taken along lines 30-30 of FIG. 28.

The same reference numerals refer to the same parts throughout the various Figures.

DESCRIPTION OF THE PREFERRED EMBODIMENT

Figure 1:
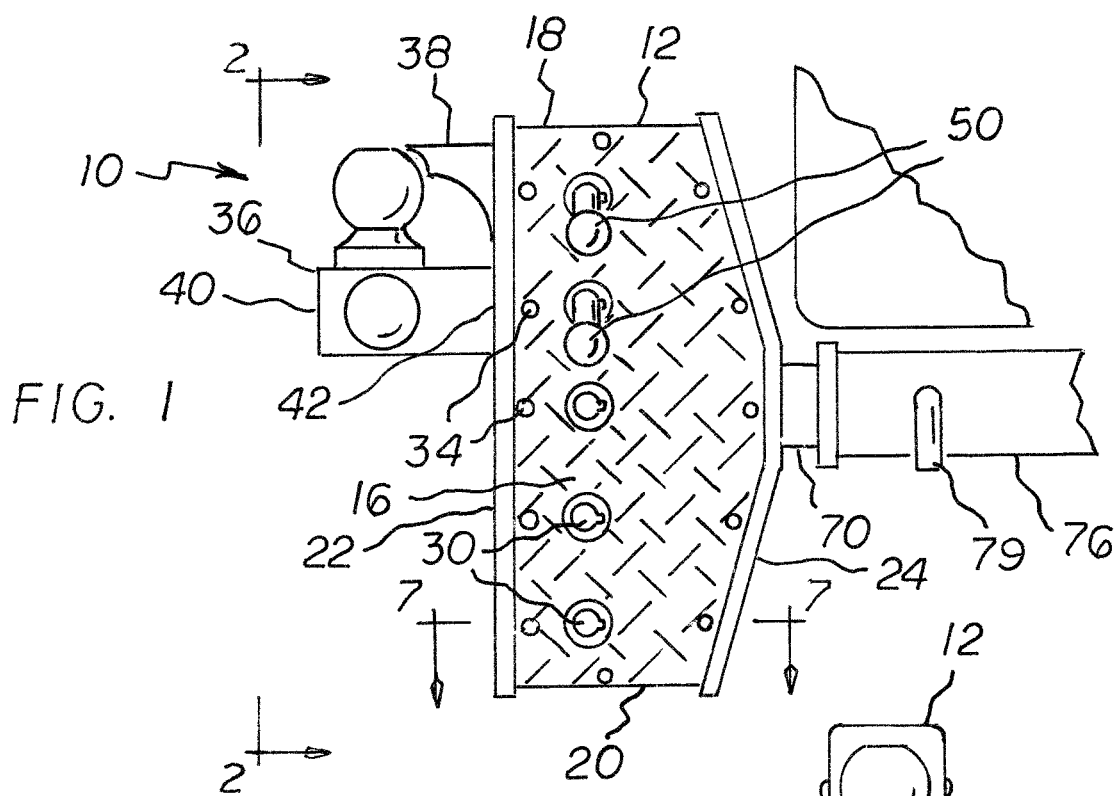
FIG. 1 is a side elevational view of the hitch/step system configured as a vertically adjustable hitch constructed in accordance with the principles of the current invention.
Figure 2:
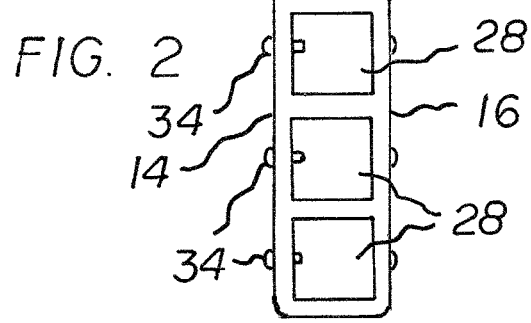
FIG. 2 is a rear elevational view of the hitch/step system configured as a vertically adjustable hitch taken along lines 2-2 of FIG. 1.

With reference now to the drawings, and in particular to FIGS. 1-10 thereof, the preferred embodiment of the new and improved hitch/step system embodying the principles and concepts of the present invention and generally designated by the reference numeral 10 will be described.

The present invention, the hitch/step system 10 is comprised of a plurality of components. Such components are individually configured and correlated with respect to each other so as to attain the desired objective. Such components in their broadest context include a receiver housing formed with a coupling leg for attaching to a standard hitch receiver. A plurality of attachments including a ball mount, a pintle lock and other attachments are provided along with retaining pins for coupling the attachments to the receiver housing. The receiver housing can be configured for use as a step when in a horizontal orientation and for use as a vertically adjustable hitch when in a vertical orientation.

Figure 3:
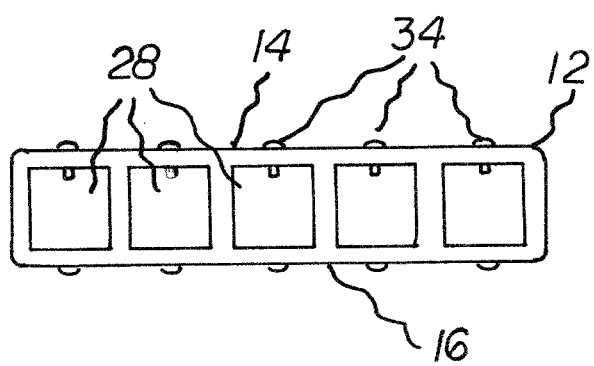
FIG. 3 is a rear elevational view of the hitch/step system configured horizontally as a step.
Figure 3A:
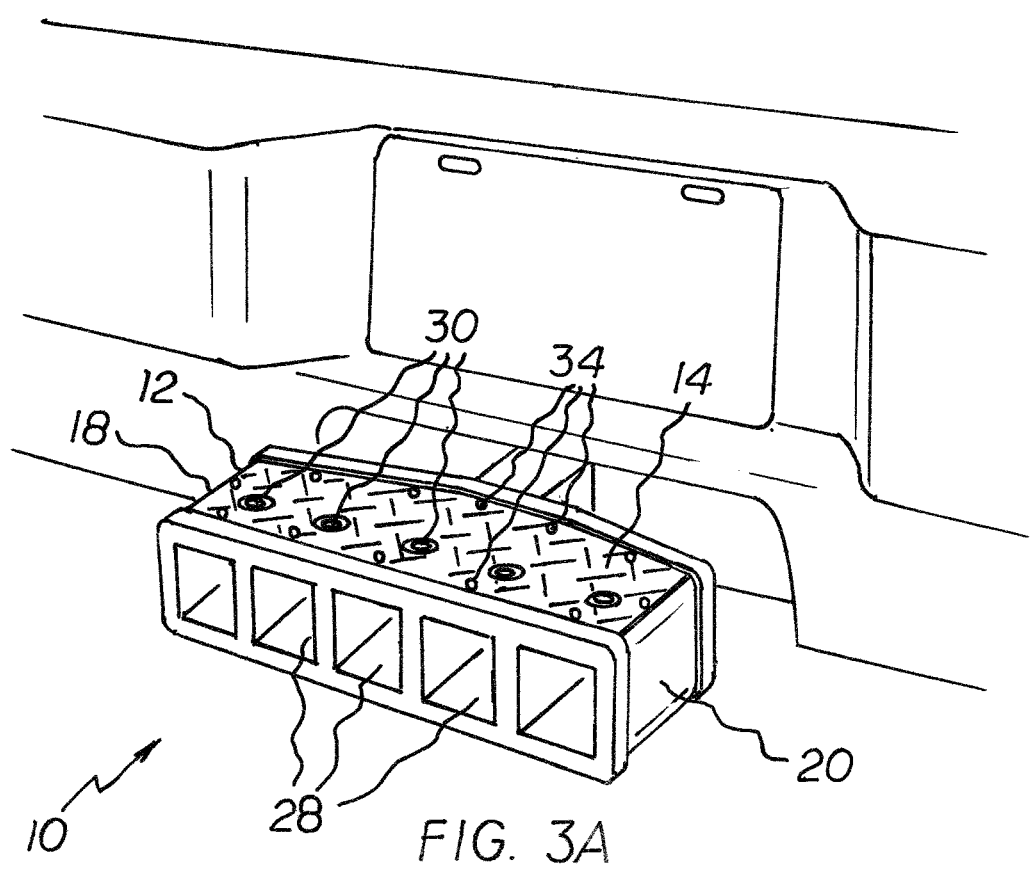
FIG. 3A is a perspective view of the hitch/step system configured horizontally as a step constructed in accordance with the principles of the current invention.

From a specific perspective, in reference to FIGS. 1 through 10 the preferred embodiment of the invention of the present application is a hitch/step system 10 for purpose of coupling a vehicle to a trailer at various heights and providing a supporting platform for use as a step. The coupling and the supporting being done in a safe, convenient, and economical manner. In the preferred embodiment first provided is a housing 12. The housing is formed with an upper surface 14 and a lower surface 16 with a space there between. The upper and lower surfaces formed of diamond plate or any other molded design having anti-slip properties. The upper and lower surfaces maybe be integrally formed as part of the housing or separate plates attached to the housing using screws. Two sides 18 20 connect the upper surface 14 to the lower surface 16. The housing has an open rearward face 22 and a forward face 24. The housing having an interior formed with three or more receiving channels 28. The receiving channels extend inward from the rearward face and have a rectangular cross-section. The diagonal of the receiving channels have a first length. A row of diametrically opposed apertures 30 are formed laterally along the upper surface and lower surface between the two sides intersecting each of the receiving channels. In the preferred embodiment the diametrically opposed apertures are formed with a key notch 31 for engaging with a receiving pins formed with a key pin. The housing is rotationally configurable between a first position horizontally aligned for use as a step shown in FIGS. 2 and 3A, and a second position vertically aligned for use as a vertically adjustable hitch receiver shown in FIGS. 1, 2 and 4. Three or more set screws 34 are spaced laterally along the upper surface between the two sides adjacent to the rearward edge and aligned with the diametrically opposed apertures. The set screws 34 projecting into each of the channels for engaging the post of the ball mount 36, pintle lock 38 and various other attachments to prevent movement inside the receiving channel and avoiding rattling.

Next provided in the preferred embodiment is a coupling leg 70 extending forwardly from the housing for attaching to a trailer hitch receiver 76 formed in a hollow tubular configuration with a rearwardly facing opening and having two sides with horizontally aligned receiver apertures. The coupling leg has one or more horizontal bores 72 (FIG. 4) and one or more vertical bores 78 (FIG. 5). The horizontal bore(s) are alignable with the horizontally aligned receiver apertures of the trailer hitch receiver when the housing is configured in the first position for use as a step. The vertical bore(s) are alignable with horizontally aligned receiver apertures of the trailer hitch receiver when the housing is configured in the second position for use as a vertically adjustable hitch. A hitch pin 79 is positioned through the horizontally aligned receiver apertures of the trailer hitch receiver and either the horizontal bore 72 or the vertical bore 78 depending on the orientation of the housing for removable coupling the coupling leg to the trailer hitch receiver.

Lastly, in the preferred embodiment, a ball mount 36 is provided. The ball mount formed with one or more balls 39 for receiving a trailer coupler and a base 40. A post 42 extends forwardly from the ball base. The post is formed with a rectangular cross section. The diagonal of the post having a second length. The first length being greater than the second length. The post is configured to be inserted into and coupled to one of the receiving channels. The post has a horizontal bore 44 alignable with the diametrically opposed apertures of the upper and lower surface intersecting the receiving channel. A receiving pin 50 is inserted in the diametrically opposed apertures removably coupling the ball mount to the housing.

Figure 15:
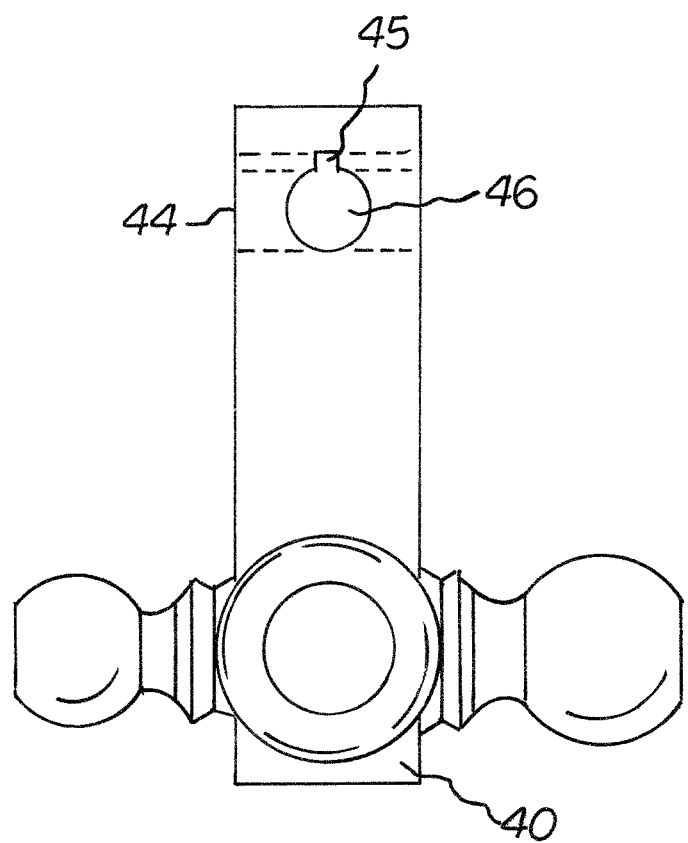
FIG. 15 is a top plan view of a multiple ball mount for use with a hitch/step system taken along lines 15-15 of FIG. 14.
Figure 16:
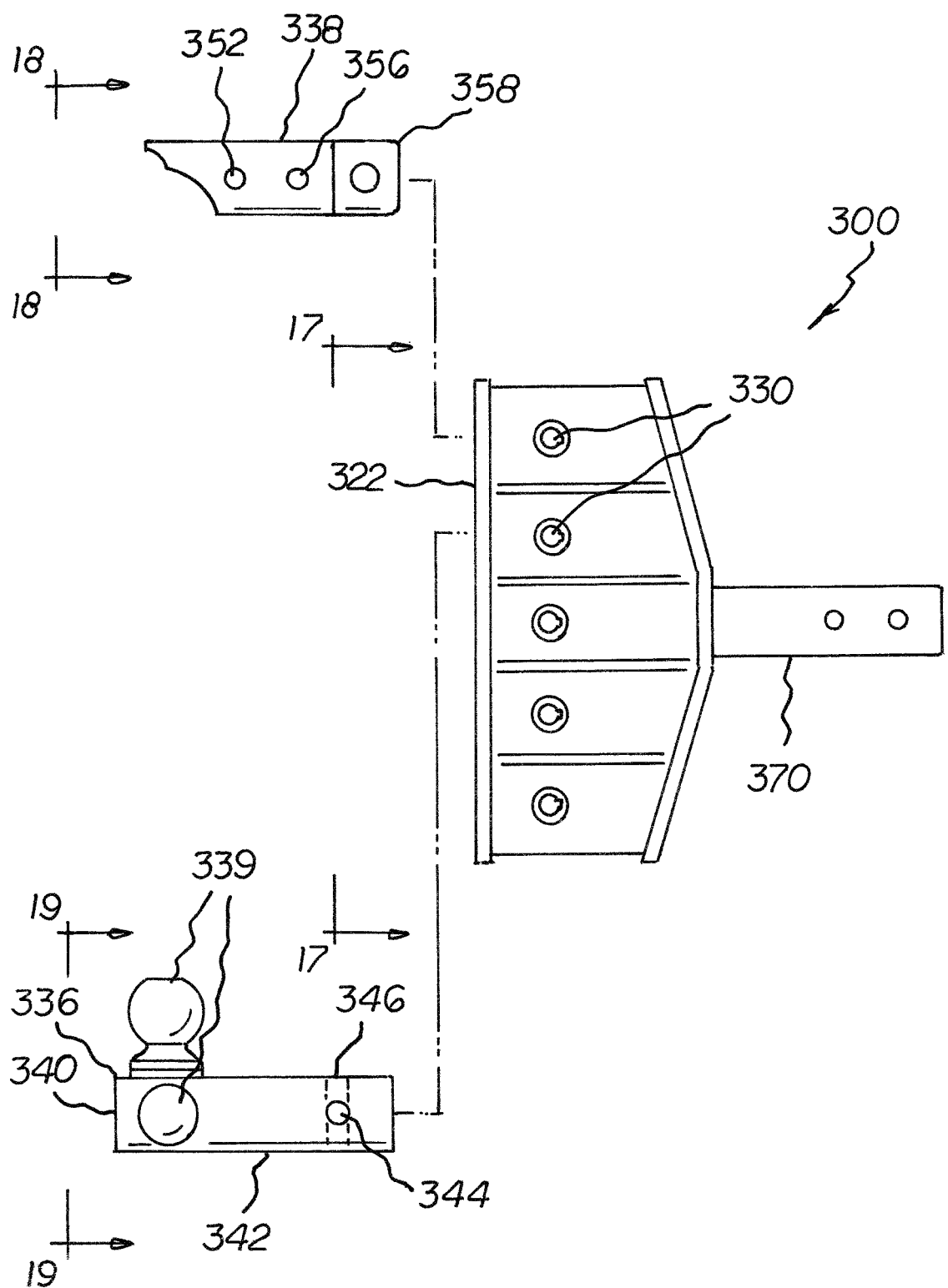
FIG. 16 is an exploded side view of a hitch/step system having a circular cross section with a ball mount and a pintle lock constructed in accordance with an alternate embodiment of the current invention.
Figure 17:
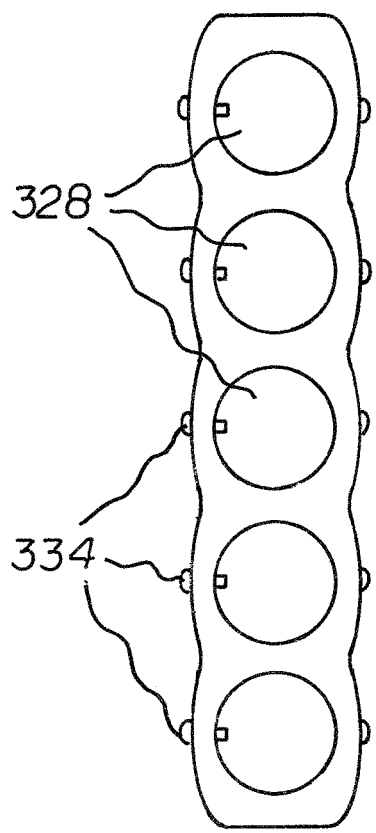
FIG. 17 is a rear elevational view of an alternate embodiment of a hitch/housing having circular receiving channels taken along lines 17-17 of FIG. 16.
Figure 18:
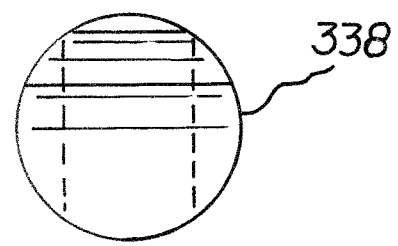
FIG. 18 is a front elevational view of a pintle lock for use with a hitch/step system taken along lines 18-18 of FIG. 16.
Figure 19:
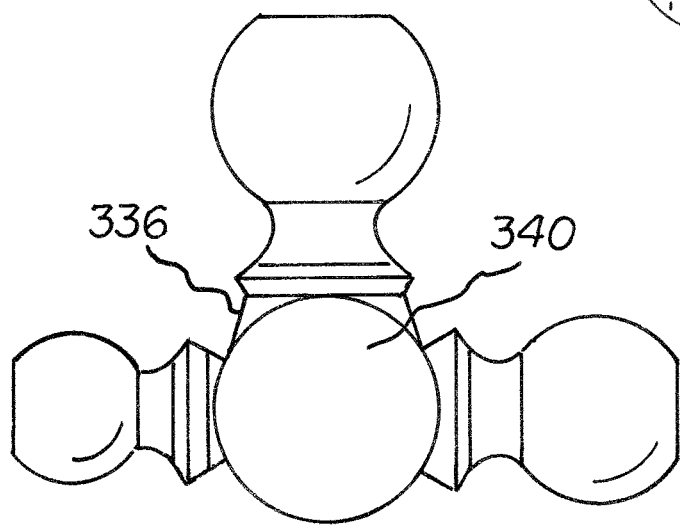
FIG. 19 is front elevational view of a multiple ball mount for use with a hitch/step system taken along lines 19-19 of FIG. 16.

An optional post key notch 45 shown in FIG. 15 extends the length of the horizontal bore of the post aligning with the key notch 31 of the diametrically opposed apertures of the upper and lower surfaces of the housing for receiving a receiver pin key 93.

Figure 4:
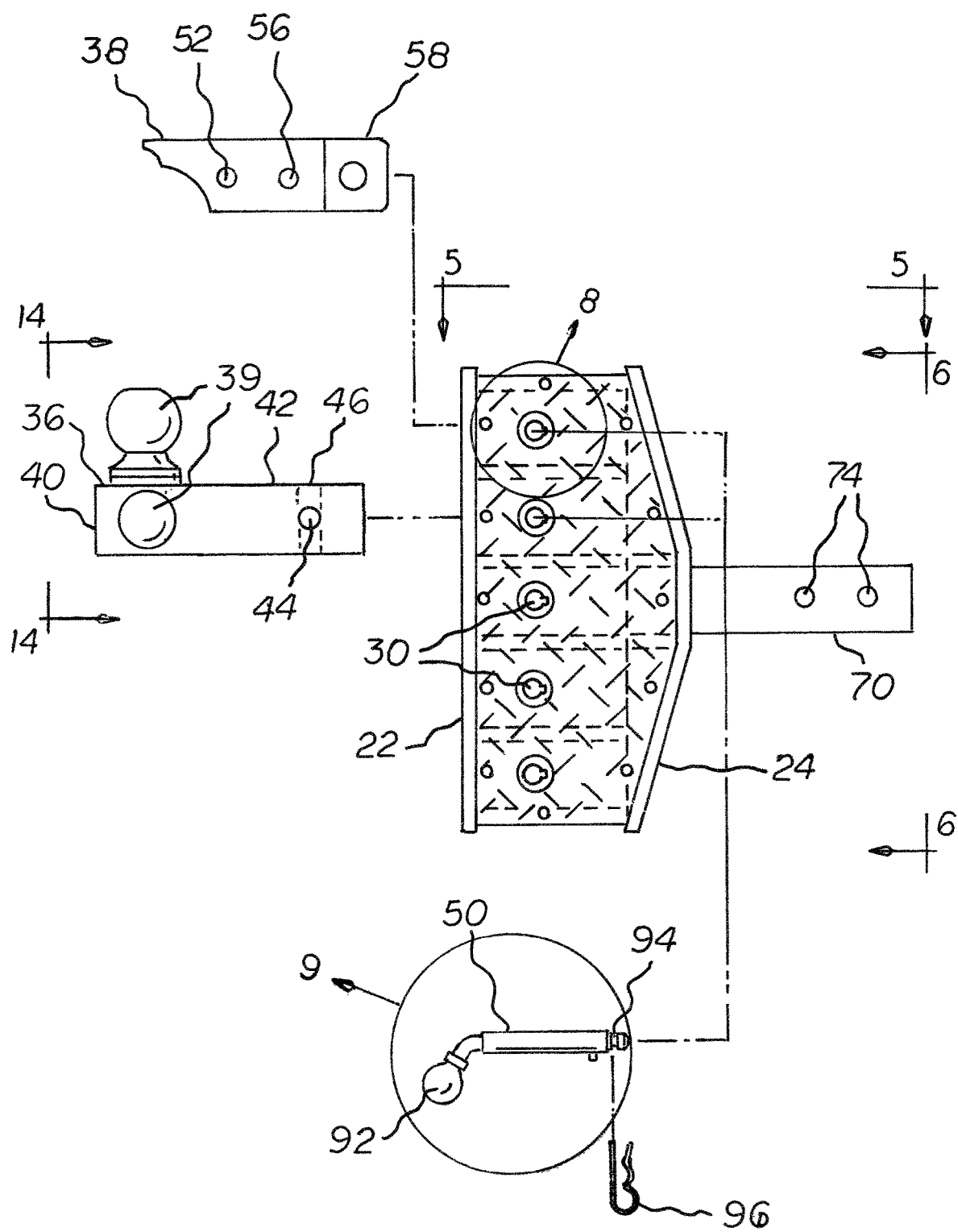
FIG. 4 is an exploded view of a hitch/step system configured as a vertically adjustable hitch constructed in accordance with the principles of the current invention.
Figure 5:
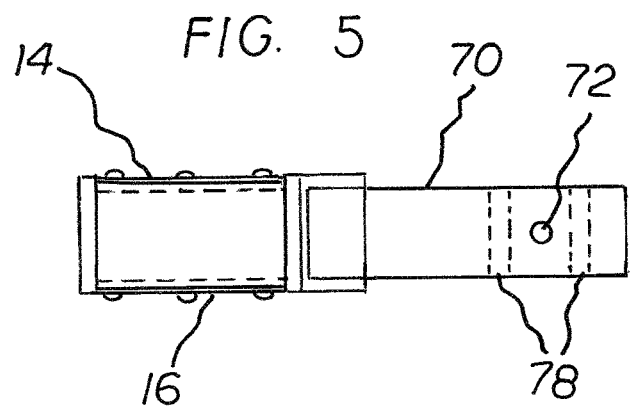
FIG. 5 is top plan view of the hitch/step system configured as a vertically adjustable hitch constructed in accordance with the principles of the current invention.
Figure 6:
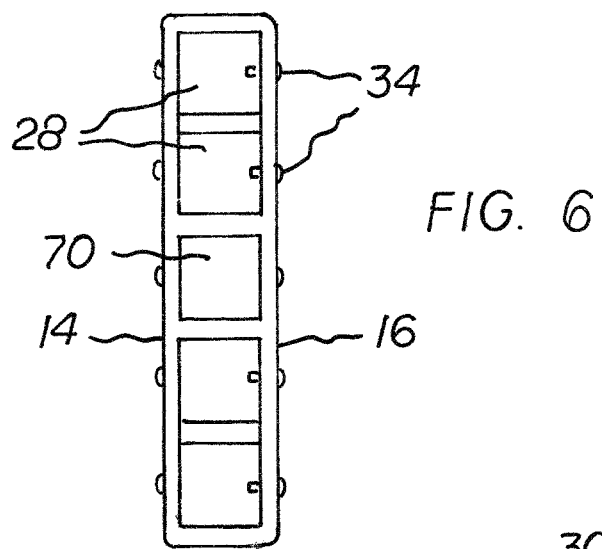
FIG. 6 is a rear view of the hitch/housing in the vertical position.
Figure 7:
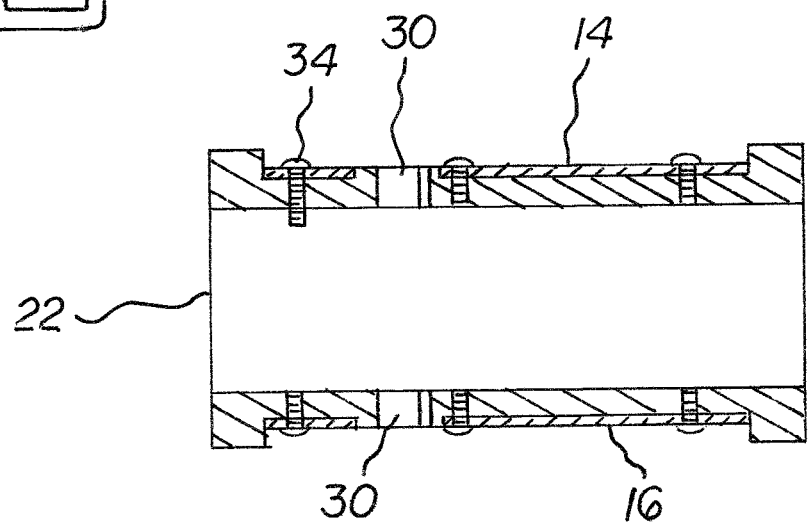
FIG. 7 is a cross-section of the hitch/housing showing a receiving channel and set screw taken along lines 7-7 of FIG. 1.
Figure 8:
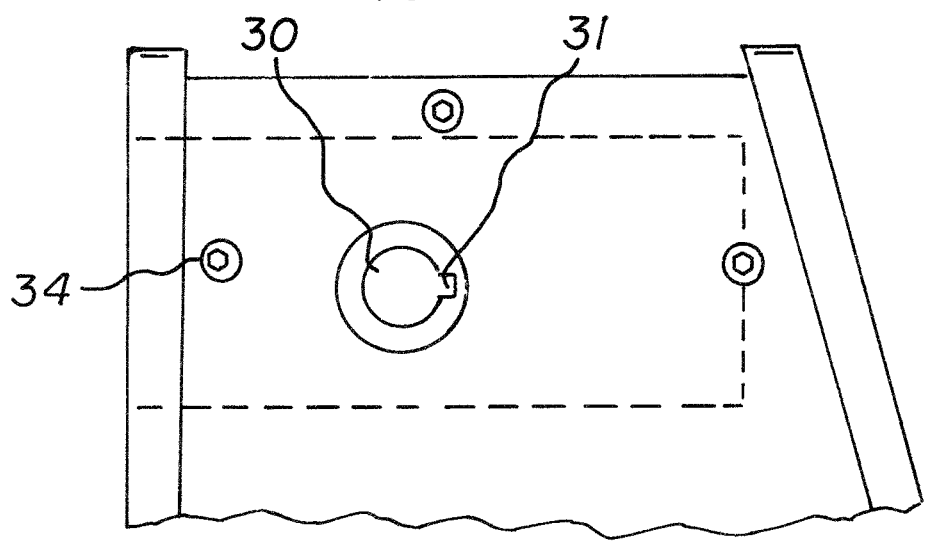
FIG. 8 is an enlarged view of the set screw and retaining pins hole as they relate to an internal channel taken from FIG. 4.
Figure 11:
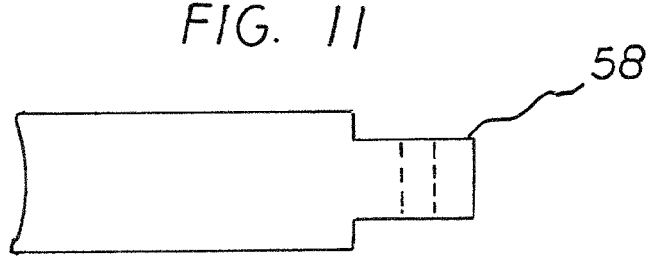
FIG. 11 is a top plan view of a pintle lock post for use with a hitch/step system having a second end formed with a D-ring for attaching a shackle hitch.
Figure 12:
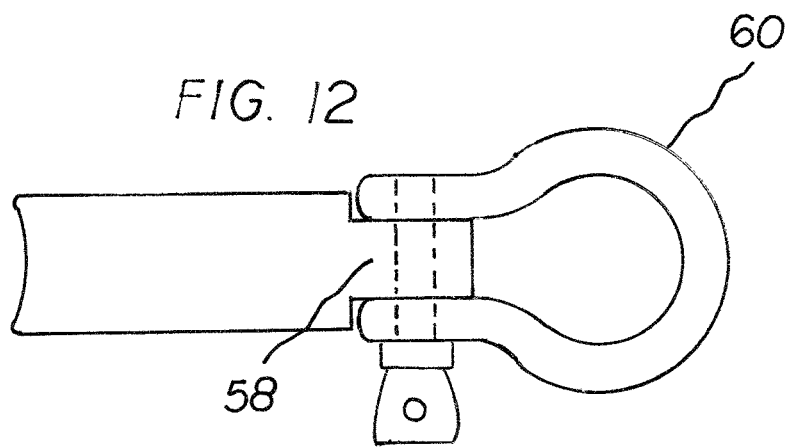
FIG. 12 is a top plan view of a shackle hitch for use with a hitch/step system.
Figure 13:
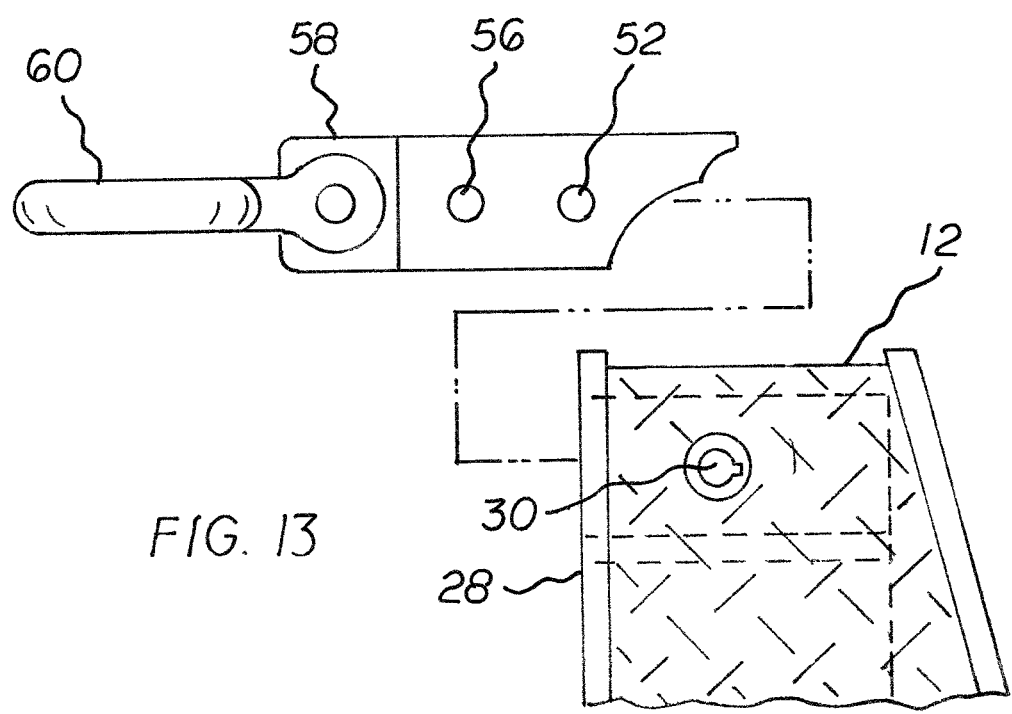
FIG. 13 is side elevational view of a shackle hitch attachment connected to the D-ring formed in the opposite end of the pintle lock post for use with a hitch/step system.

In the preferred embodiment the attachments includes an optional pintle lock 38 for use when hauling heavy weight equipment as shown in FIGS. 1, 4 and 5. The pintle lock is formed with a post having one or more horizontal bores 52 56 and configured to be inserted in one of the receiving channels and coupled to the housing using a receiving pin. In the preferred embodiment the pintle lock post is formed with a second end forming a D-ring 58 for attaching a shackle 60 as shown in FIGS. 11-13.

Figure 9:
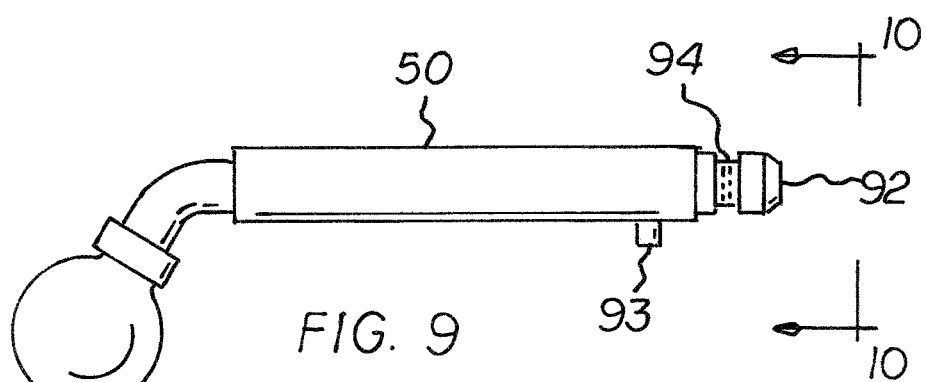
FIG. 9 is an enlarged side elevational view of a hitch retaining pin taken from FIG. 4.
Figure 10:
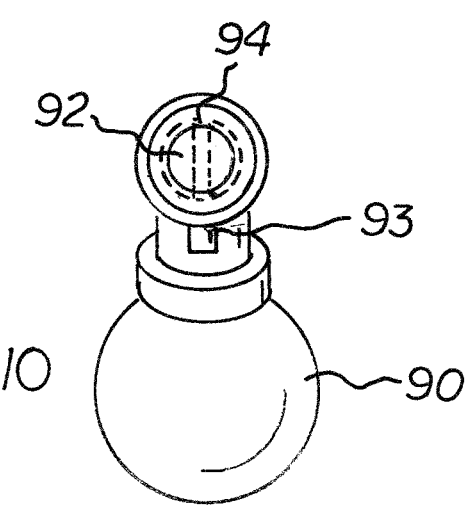
FIG. 10 is a rear elevational view of a hitch retaining pin taken along lines 10-10 of FIG. 9.
Figure 9A:
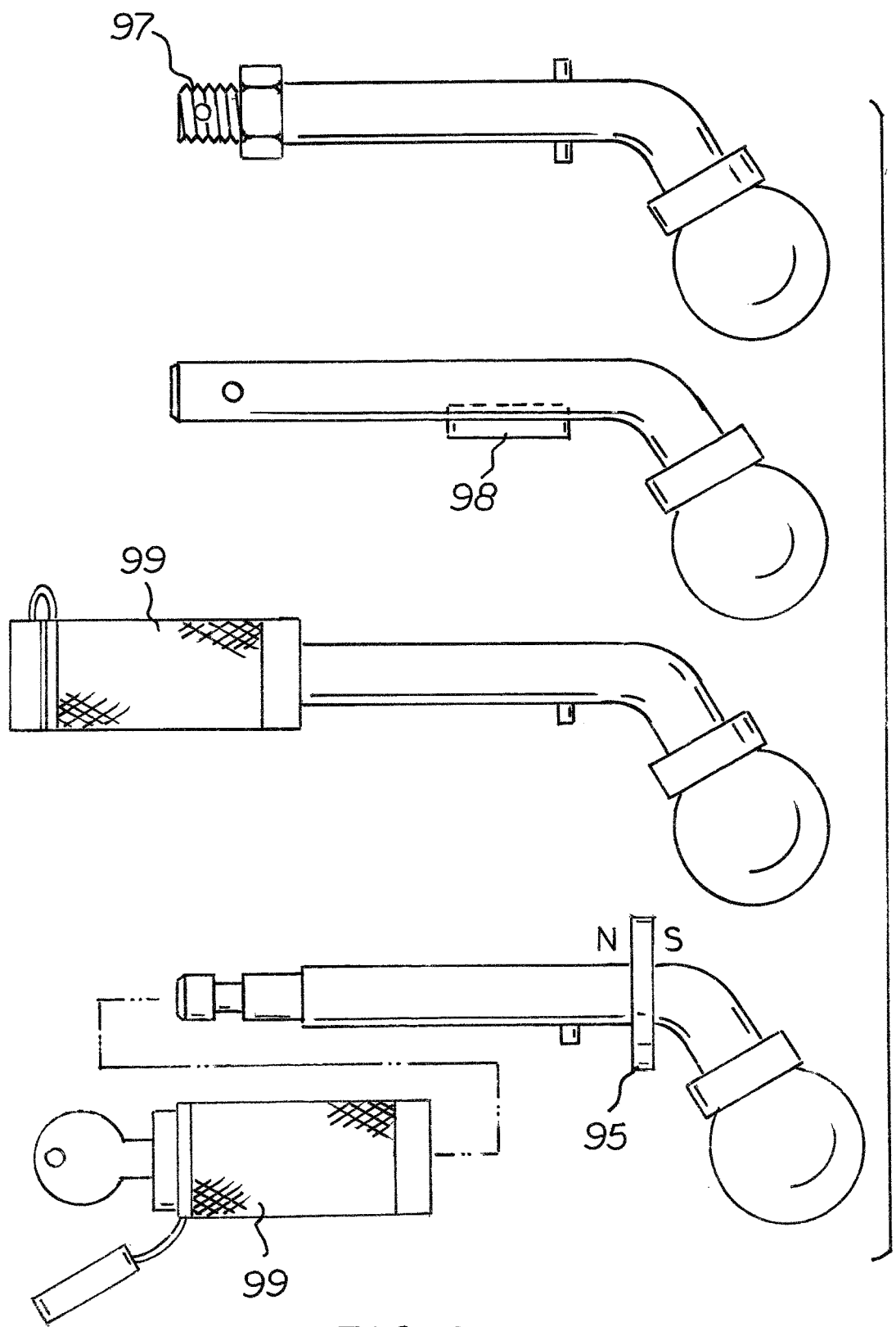
FIG. 9A is a side view of various embodiments of hitch retaining pins for use with a hitch/step system.

In the preferred embodiment the receiving pin 50 as shown in FIGS. 4, 9 and 10 is formed with a proximal end 90 and a distal end 92. The proximal end angled to allow for turning and locking when inserted. The distal end is formed with an annular groove 94 for receiving a cotter pin 96 once inserted through the diametrically opposed apertures securing the attachment posts to the housing. A key pin extends radially from the receiving pin adjacent to the annular groove. Alternatively as shown in FIG. 9A, a plurality of receiving pins may be included. The plurality of receiving pins include a pin having a threaded distal end 97 for receiving a nut, a pin having an locking bar 98 extending radially along a length of the pin for engaging the interior edge of the diametrically opposed apertures, and a pin having a key lock 99 attachable to the distal end and/or an annular ring 95 adjacent to the proximal end for engaging the upper plate surrounding the diametrically opposed apertures.

Figure 14:
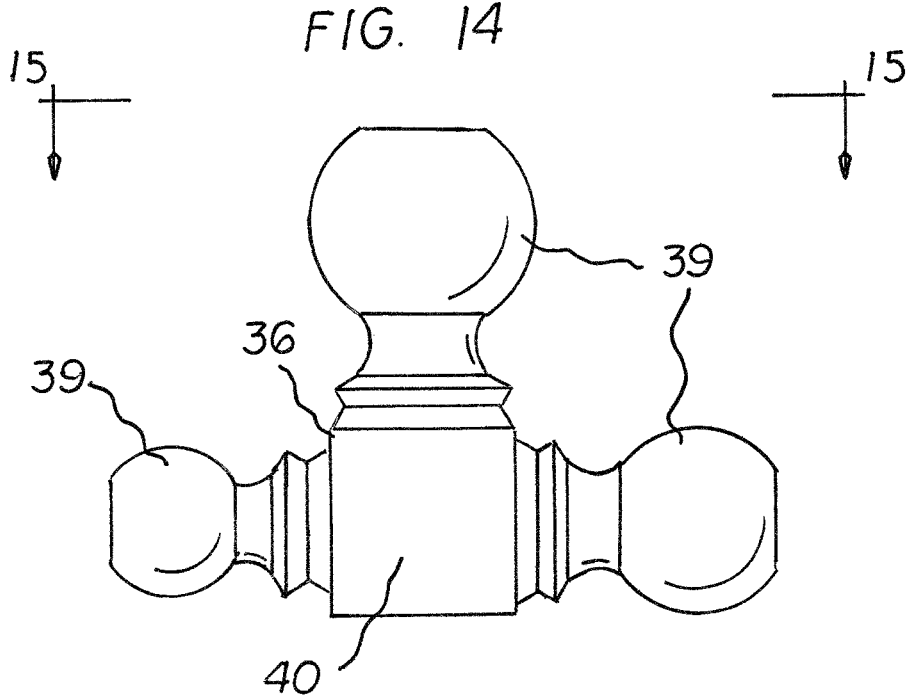
FIG. 14 is a rear elevational view of a multiple ball mount for use with a hitch/step system.

A plurality of ball mounts may be included. In the preferred embodiment a three ball mount is provided as shown in FIGS. 14 and 15. The attachment post 42 of the three ball mount has an intersecting horizontal 44 and vertical 46 bores. An optional key notch extends the length of the bores for receiving a pin formed with a key pin for locking the pin in place.

In an alternate embodiment of the hitch/step system 300, shown in FIG. 16-19, the receiving channels and attachment posts are formed with a circular cross-section. The housing formed with an upper surface and a lower surface with a space there between. Two sides connect the upper surface to the lower surface. The housing has an open rearward face 322 and a forward face. The housing has an interior formed with three or more receiving channels 328. The receiving channels extend inward from the rearward face and are formed with a circular cross-section. The receiving channels have a first diameter. Diametrically opposed apertures 530 are formed laterally along the upper surface and lower surface between the two sides intersecting each of the receiving channels. The housing is rotationally configurable between a first position horizontally aligned for use as a step, and a second position vertically aligned for use as a vertically adjustable hitch receiver. Three or more optional set screws 334 are spaced laterally along the upper surface between the two sides and adjacent to the rearward face and aligned with the diametrically opposed apertures. A coupling leg 370 extends forwardly from the housing. The coupling leg has one or more horizontal bores and one or more vertical bores. The horizontal bore is alignable with the horizontal bore of a trailer hitch receiver when the housing is configured in the first position as a step and the the vertical bore is alignable with a horizontal bore of a trailer hitch receiver when the housing is configured in the second position as a vertically adjustable hitch. A hitch pin positioned through the horizontal bore of the trailer hitch receiver removably couples the coupling leg to the trailer hitch receiver, A plurality of attachments are provided each having a post with a cylindrical cross section. Each post formed with a second diameter. The first diameter of the receivers being greater than the second diameter of the post. Each attachment post is configured to be inserted into and coupled to one of the receiving channels. The plurality of attachments include a ball mount 336. The ball mount formed with one or more balls 339 for receiving a trailer coupler and a base 340. A post 342 extends forwardly from the ball base. The post is configured to be inserted into and coupled to one of the receiving channels. The post has a horizontal bore 344 alignable with the diametrically opposed apertures of the upper and lower surface intersecting the receiving channel. The post has a vertical bore 346 alignable with the diametrically opposed apertures of the upper and lower surface intersecting the receiving channel. A retaining pin is positionable through the diametrically opposed apertures of the upper and lower surfaces and the diametric aperture of the post removably coupling the post of the ball mount to the receiving channel of the housing.

Also provided is a pintle lock 338. The pintle lock is formed with a post having one or more horizontal bores 352 356 and configured to be inserted in one of the receiving channels and coupled to the housing using a receiving pin. In an optional configuration, the pintle lock post is formed with a second end forming a D-ring 358 for attaching a shackle. A retaining pin positionable through the diametrically opposed apertures and the diametric aperture of the post removably coupling the post of the pintle lock attachment to the receiving channel of the housing.

Figure 20:
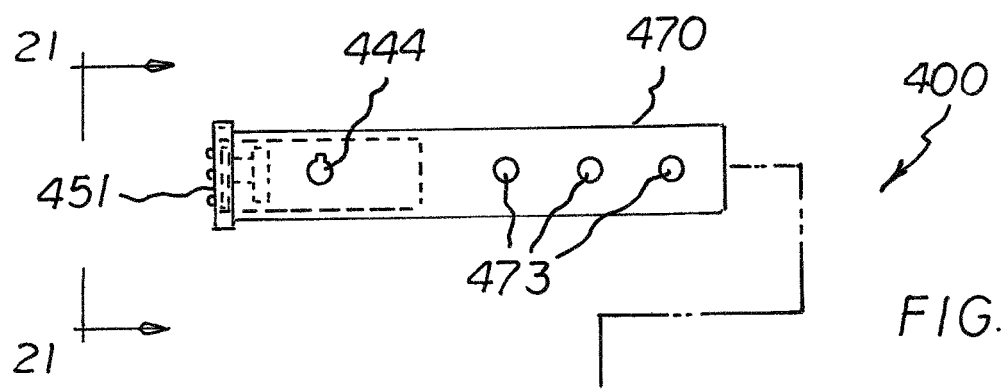
FIG. 20 is an exploded view of an alternate embodiment of a hitch/step system including a support bar with an LED light.
Figure 21:
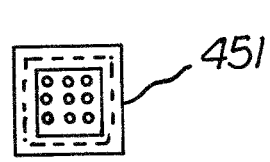
FIG. 21 is a front view of an LED light for use with a hitch/step system taken along lines 21-21 of FIG. 20.
Figure 22:
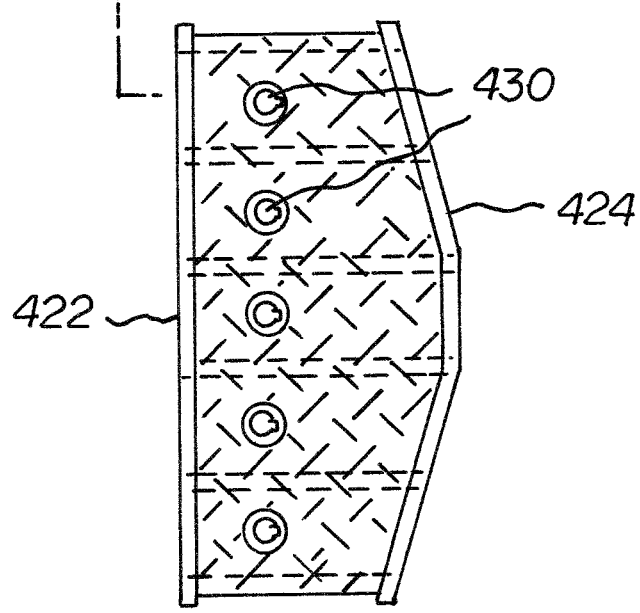
FIG. 22 is a perspective drawing of an alternate embodiment including a support bar with an LED light.
Figure 22:
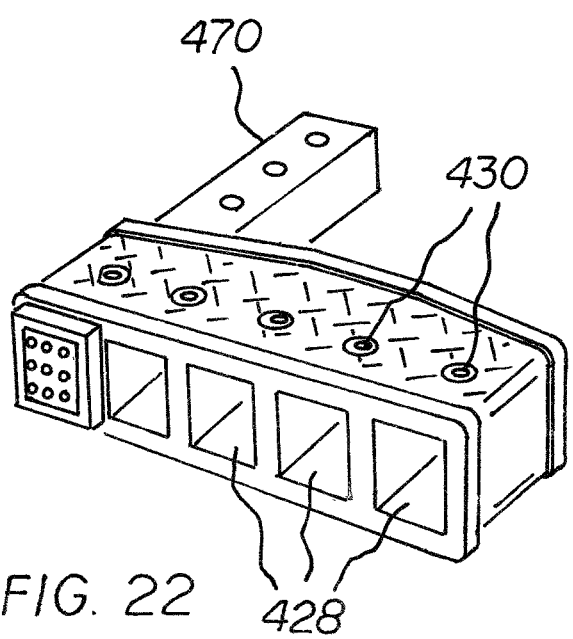
Figure 26:
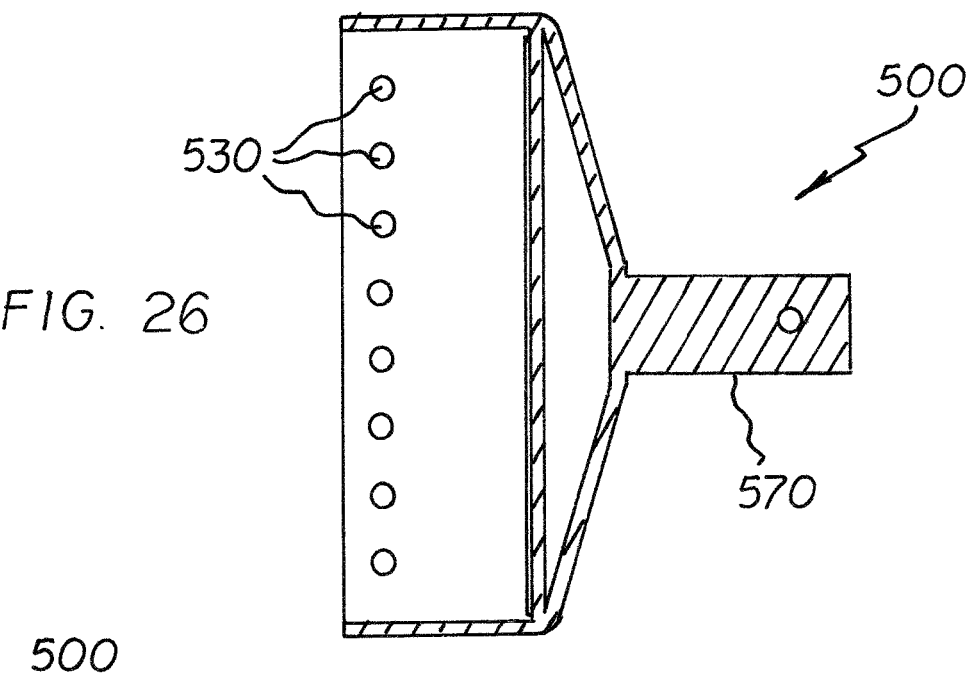
FIG. 26 is a cross-sectional top view of another alternate embodiment of a hitch/step system taken along lines 26-26 of FIG. 24.
Figure 27:
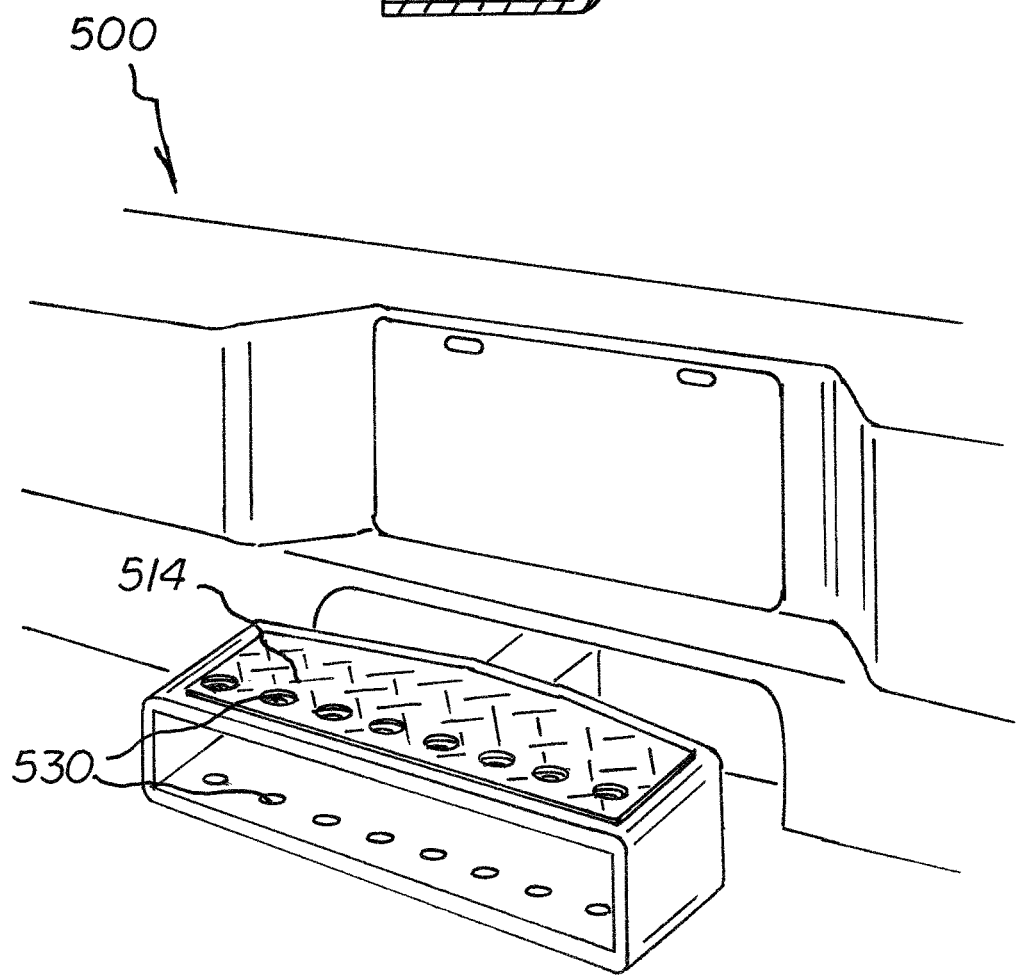
FIG. 27 is a perspective view of another alternate embodiment of a hitch/step system having an open interior.

In still another alternate embodiment 400 shown in FIGS. 20-22 the housing is formed with an open forward face 424 forming pass through receiving channels allowing the supporting posts of the attachments to be inserted in the receiving channels 428 and extend forwardly of the forward face. A row of diametrically opposed apertures 430 are formed laterally along the upper surface and lower surface between the two sides intersecting each of the receiving channels. The post has a rearward horizontal bore 444 alignable with the diametrically opposed apertures of the upper and lower surface 430 intersecting the receiving channel 428. The forwardly extending posts of the attachments are formed with an elongated post and additional bores 473 alignable with the horizontal bore of the trailer hitch receiver. A hitch pin is positioned through the horizontally aligned receiver apertures of the trailer hitch receiver and one of the bores 473 of the elongated post depending on the orientation of the housing for removable coupling the coupling leg to the trailer hitch receiver. The attachments FIG. 21 show an optional attachment having LED lights 451 on the rearward end of the post. Additionally reflectors could be used instead of the LED lights.

Figure 28:
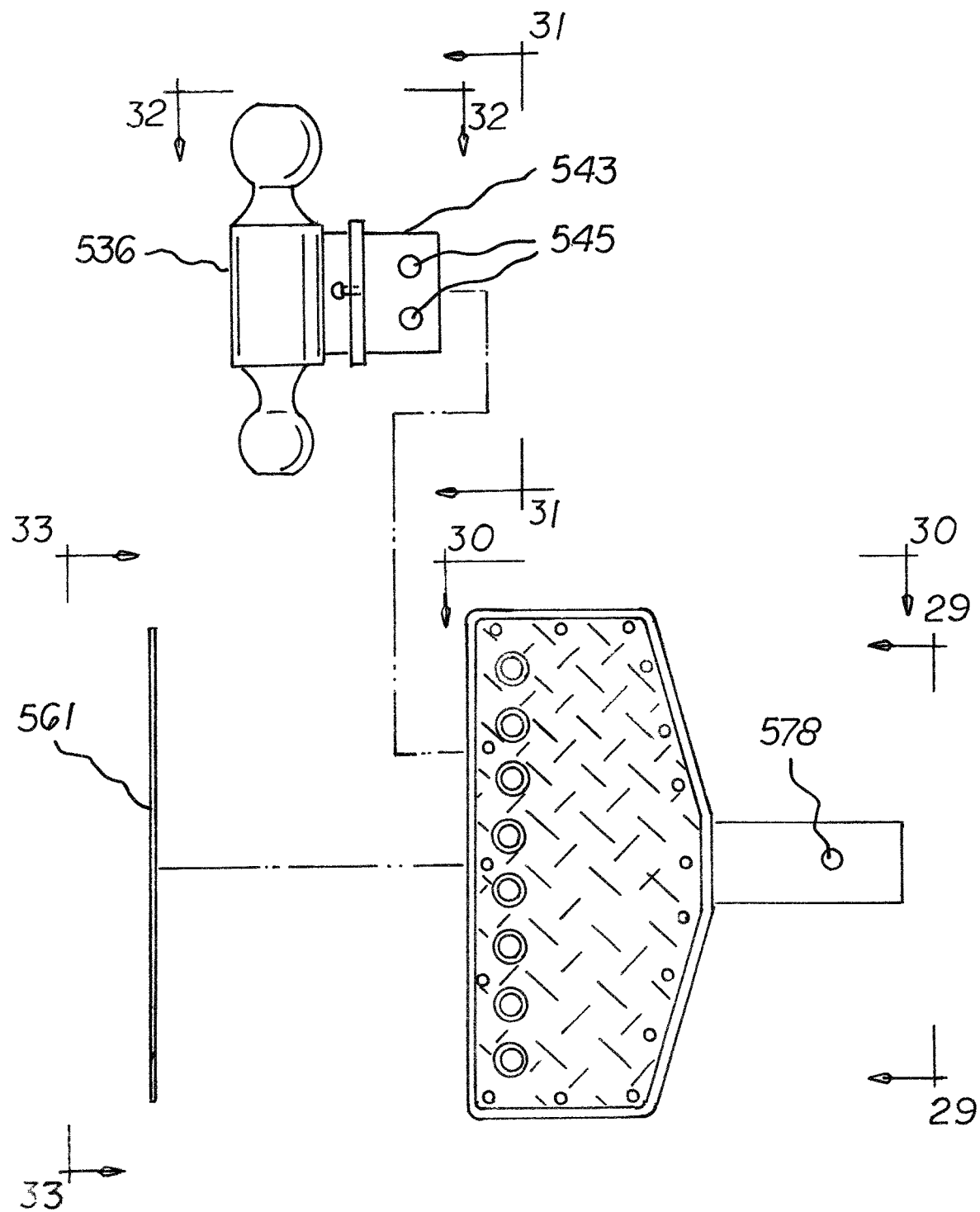
FIG. 28 is an exploded view of another alternate embodiment of a hitch/step system including a reflective light bar and double ball mount.
Figure 31:
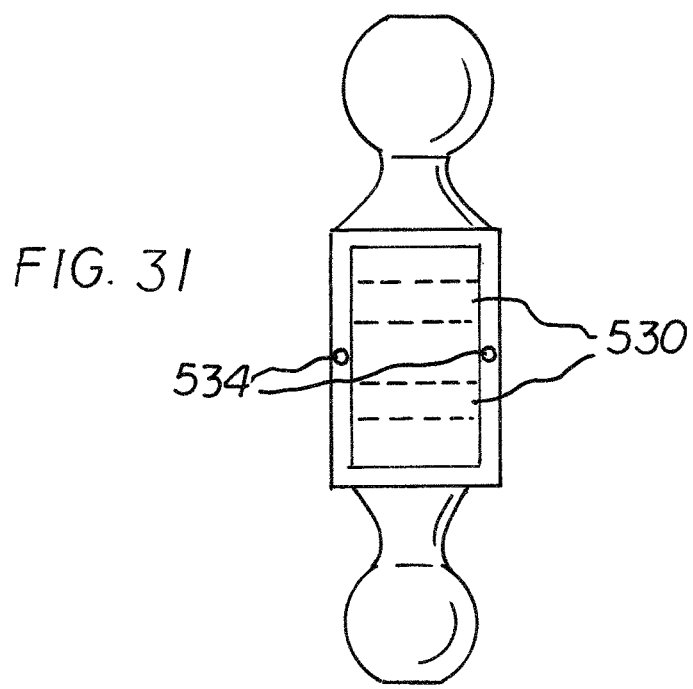
FIG. 31 is rear elevational view of a double ball mount for use with a hitch step system taken along lines 31-31 of FIG. 28.
Figure 32:
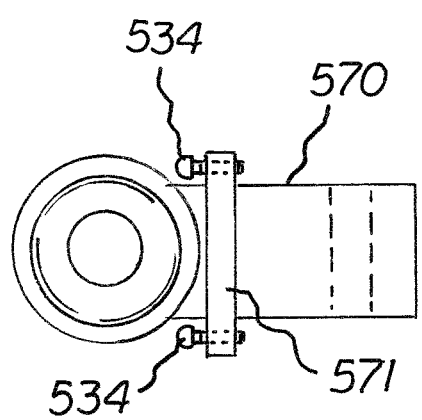
FIG. 32 is top plan view of a double ball mount for use with a hitch step system taken along lines 32-32 of FIG. 28.
Figure 33:
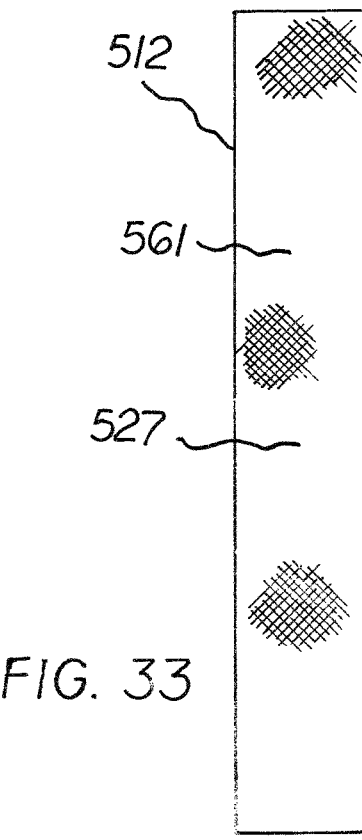
FIG. 33 is a front elevational view of a reflector bar for use with a hitch/step system taken along lines 33-33 of FIG. 28.

In yet another alternate embodiment of the hitch/step system 500, shown in FIGS. 23-33, the housing 512 is formed with an upper surface 514 and a lower surface 516 with a space there between and with two sides 518 520 connecting the upper surface to the lower surface. The housing 510 has an open rearward face 522, a forward face 524 and a hollow interior 525. A row of equally spaced diametrically opposed apertures 530 are formed laterally along the upper surface and lower surface between the two sides. The housing is rotationally configurable between a first position horizontally aligned for use as a step shown in FIG. 27, and a second position vertically aligned for use as a vertically adjustable hitch receiver shown in FIG. 23. A coupling leg 570 extends forwardly from the housing for attaching to a trailer hitch receiver 576 formed in a hollow tubular configuration with a rearwardly facing opening and having two sides with horizontally aligned receiver apertures. The coupling leg has one or more horizontal bores and one or more vertical bores. The horizontal bores are alignable with the horizontally aligned receiver apertures of the trailer hitch receiver when the housing is configured in the first position for use as a step. The vertical bores are alignable with horizontally aligned receiver apertures of the trailer hitch receiver when the housing is configured in the second position for use as a vertically adjustable hitch. A hitch pin 578 is positioned through the horizontally aligned receiver apertures of the trailer hitch receiver and either a horizontal bore or the vertical bore depending on the orientation of the housing for removable coupling the coupling leg to the trailer hitch receiver. A plurality of attachments are provided. Each of the attachments formed with a supporting leg 543 extending forwardly from the attachment. The supporting legs have two equally spaced vertical apertures 545 alignable with the equally spaced diametrically opposed apertures 530 for coupling the supporting legs to the housing. The plurality of attachments including a ball mount 536, a pintle lock (not shown), a shackle (not shown) and a light (not shown). Dual retaining pins 550 are positionable through two of the diametrically opposed apertures 530 and the two equally spaced vertical apertures 545 removably coupling the supporting leg of the attachment to the housing 512. A flange 531 is formed on the supporting leg adjacent to the ball mount base 540. Two set screws 535 project through the flange on either side of the ball mount base to engage the front edges of the rearward face to prevent movement of the ball mount and avoiding rattling. FIGS. 24 and 25 show a housing having a reflective interior surface 523. FIGS. 28 and 33 show a reflector bar 561 have a reflective surface 527 removably attachable to the rearward face of the housing.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hitch/step system for attachment to a vehicle configured for use as a step when in a horizontal orientation and for use as a vertically adjustable hitch when in a vertical orientation, the system comprising in combination:

a housing, the housing formed with an upper surface and a lower surface with a space there between, two sides connecting the upper surface to the lower surface, the housing having a rearward face and a forward face, the rearward face being open, the housing having an interior, the interior formed with three or more receiving channels, the receiving channels extending inward from the rearward face, the receiving channels having a rectangular cross-section, diametrically opposed apertures formed laterally along the upper surface and lower surface between the two sides intersecting each of the receiving channels, the housing rotationally configurable between the horizontal orientation horizontally aligned for use as the step, and the vertical orientation vertically aligned for use as the vertically adjustable hitch receiver, three or more set screws space laterally along the upper surface between the two sides and adjacent to the rearward edge and aligned with the diametrically opposed apertures;

a trailer hitch receiver, the trailer hitch receiver formed in a hollow tubular configuration with a rearwardly facing opening, the trailer hitch receiver having two sides, the sides having horizontally aligned receiver apertures;

a coupling leg extending forwardly from the housing, the coupling leg having one or more horizontal bores, the coupling leg having one or more vertical bores, the horizontal bore alignable with the horizontally aligned receiver apertures of the trailer hitch receiver when the housing is configured in the horizontal orientation, the vertical bore alignable with horizontally aligned receiver apertures of the trailer hitch receiver when the housing is configured in the vertical orientation, a hitch pin positioned through the horizontally aligned receiver apertures of the trailer hitch receiver for removably coupling the coupling leg to the trailer hitch receiver;

a ball mount, the ball mount formed with a base, a post and one or more balls for receiving a trailer coupler, the post extending forwardly from the base of the ball mount, the post having a rectangular cross section, the post configured to be inserted into and coupled to one of the receiving channels, the post formed with a horizontal bore alignable with the diametrically opposed apertures of the upper and lower surfaces and intersecting the receiving channels; and a retaining pin positionable through the diametrically opposed apertures and the diametric aperture of the post removably coupling the post of the ball mount to the receiving channel of the housing.

2. The hitch/step system set forth in claim 1 further comprising a pintle lock, the pintle lock formed with a pintle and a supporting post, the supporting post extending forwardly from the pintle, the supporting post having a rectangular cross section, the supporting post configured to be inserted into and coupled to one of the receiving channels, the supporting post formed with a horizontal bore alignable with the diametrically opposed apertures of the upper and lower surfaces and intersecting the receiving channel.

3. The hitch/step system set forth in claim 2 where in the supporting post of the pintle lock is formed with a forward end forming a D-ring for attaching a shackle.

4. The hitch/step system set forth in claim 1 further comprising a shackle hitch, the shackle hitch formed with a shackle and a supporting post, the supporting post extending forwardly from the shackle, the supporting post having with a rectangular cross section, the post configured to be inserted into and coupled to one of the receiving channels, the supporting post formed with a horizontal bore alignable with the diametrically opposed apertures of the upper and lower surfaces and intersecting the receiving channel.

5. A hitch/step system for attachment to a vehicle configured for use as a step when in a horizontal orientation and for use as a vertically adjustable hitch when in a vertical orientation, the system comprising in combination:

a housing, the housing formed with an upper surface and a lower surface with a space there between, two sides connecting the upper surface to the lower surface, the housing having a rearward face and a forward face, the rearward face being open, the housing having an interior, the interior formed with three or more receiving channels, the receiving channels extending inward from the rearward face, the receiving channels formed with a circular cross-section, the receiving channels having a first diameter, diametrically opposed apertures formed laterally along the upper surface and the lower surface between the two sides intersecting each of the receiving channels, the housing rotationally configurable between the horizontal orientation horizontally aligned for use as a step, and the vertical orientation vertically aligned for use as the vertically adjustable hitch;

a trailer hitch receiver, the trailer hitch receiver formed in a hollow tubular configuration with a rearwardly facing opening, the trailer hitch receiver having two sides, the sides having horizontally aligned receiver apertures;

a coupling leg extending forwardly from the housing, the coupling leg having one or more horizontal bores, the coupling leg having one or more vertical bores, the one or more horizontal bores alignable with the horizontally aligned receiver apertures of the trailer hitch receiver when the housing is configured in the horizontal orientation, the one or more vertical bores alignable with the horizontally aligned receiver apertures of the trailer hitch receiver when the housing is configured in the vertical orientation, a hitch pin positioned through the horizontally aligned receiver apertures of the trailer hitch receiver for removably coupling the coupling leg to the trailer hitch receiver;

a ball mount, the ball mount formed with a base, a post and one or more balls for receiving a trailer coupler, the post extending forwardly from the base of the ball mount, the post having a circular cross section, the post configured to be inserted into and coupled to one of the receiving channels, the post formed with a horizontal bore alignable with the diametrically opposed apertures of the upper and lower surfaces and intersecting the receiving channel; and a retaining pin positionable through the diametrically opposed apertures and the horizontal bore of the post removably coupling the post of the ball mount to one of the receiving channel of the housing.

6. The hitch/step system set forth in claim 5 further comprising a pintle lock, the pintle lock formed with a pintle and a supporting post, the supporting post extending forwardly from the pintle, the supporting post formed with a circular cross section, the supporting post configured to be inserted into and coupled to one of the receiving channels, the supporting post formed with a horizontal bore alignable with the diametrically opposed apertures of the upper and lower surfaces and intersecting the receiving channel.

7. The hitch/step system set forth in claim 5 further comprising three or more set screws space laterally along the upper surface between the two sides and adjacent to the rearward face and aligned with the diametrically opposed apertures.

8. A hitch/step system for attachment to a vehicle configured for use as a step when in a horizontal orientation and for use as a vertically adjustable hitch when in a vertical orientation, the system comprising in combination:

a housing, the housing formed with an upper surface and a lower surface with a space there between, two sides connecting the upper surface to the lower surface, the housing having a rearward face and a forward face, the rearward face being open, the housing having an open interior, diametrically opposed apertures formed laterally along the upper surface and the lower surface between the two sides, the diametrically opposed apertures equally spaced, the housing rotationally configurable between horizontal orientation horizontally aligned for use as the step, and the vertical orientation vertically aligned for use as the vertically adjustable hitch;

a trailer hitch receiver, the trailer hitch receiver formed in a hollow tubular configuration with a rearwardly facing opening, the trailer hitch receiver having two sides, the sides having horizontally aligned receiver apertures;

a coupling leg extending forwardly from the housing, the coupling leg having one or more horizontal bores, and one or more vertical bores, the one or more horizontal bores alignable with the horizontal bore of a trailer hitch receiver when the housing is configured in the horizontal orientation, the one or more vertical bores alignable with the horizontal aligned receiver apertures of the trailer hitch receiver when the housing is configured in the vertical orientation;

a plurality of attachments each having a supporting leg, each supporting leg extending forwardly from the attachment, each supporting leg having two equally spaced vertical apertures, the equally spaced vertical apertures alignable with the equally spaced diametrically opposed apertures of the upper and lower surfaces of the housing, the plurality of attachments including:

a ball mount, a pintle lock, a shackle hitch, a light, a reflector, dual retaining pins positionable through two of the diametrically opposed apertures of the upper and lower surfaces of the housing and the two equally spaced vertical apertures removably coupling the supporting leg of each of the attachments to the housing.

9. The hitch/step system set forth in claim 8 wherein the forward face of the housing has an interior surface, the interior surface coated with a reflective material.

\* \* \* \* \*